(12) United States Patent
Mileti et al.

(10) Patent No.: US 6,719,867 B1
(45) Date of Patent: Apr. 13, 2004

(54) HEAT SEALER FOR THERMOPLASTIC FILMS

(76) Inventors: Robert J. Mileti, 4040 Torringford St., Torrington, CT (US) 06790; Daniel C. George, 414 Benedict Ave., Apt. 5F, Tarrytown, NY (US) 10591

( * ) Notice: Subject to any disclaimer, the term of this patent is extended or adjusted under 35 U.S.C. 154(b) by 0 days.

(21) Appl. No.: 09/483,117

(22) Filed: Jan. 14, 2000

(51) Int. Cl.⁷ .......................... B29C 65/38; B30B 15/34; B32B 31/18
(52) U.S. Cl. .................. 156/251; 156/515; 156/583.1; 156/583.2; 493/203; 493/206; 493/207
(58) Field of Search .............................. 156/251, 515, 156/583.1, 583.2, 583.3, 272.2, 324, 581, 289, 530, 553; 493/189, 203, 206, 207, 209, 193, 194, 199; 53/373, 477, 451

(56) References Cited

U.S. PATENT DOCUMENTS

| | | | |
|---|---|---|---|
| 3,253,122 A | * | 5/1966 | Kochmer et al. ............ 156/251 |
| 3,982,991 A | | 9/1976 | Hamm et al. |
| 4,055,456 A | | 10/1977 | Carnegie, Jr. |
| 4,529,472 A | | 7/1985 | Hsu |
| 4,981,546 A | | 1/1991 | Bergevin |
| 5,335,483 A | | 8/1994 | Gavronsky et al. |
| 5,474,637 A | * | 12/1995 | Soodak ..................... 156/272.6 |
| 5,538,590 A | | 7/1996 | Riley |
| 5,942,076 A | | 8/1999 | Salerno et al. |

FOREIGN PATENT DOCUMENTS

DE    3433096 A1    3/1986
SU    1118535 A    10/1984

OTHER PUBLICATIONS

Sybil P. Parker; McGraw–Hill Dictionary of Scientific and Technical Terms; 1984; McGraw–Hill Book Company; Third Edition; p. 1355.*
Derwent Abstracts for SU 1118535A.*
The Wiley Encyclopedia of Packaging Technology, "Sealing, Heat", John Wiley & Sons, 1986, pp. 574–578.

* cited by examiner

Primary Examiner—Richard Crispino
Assistant Examiner—Cheryl N. Hawkins
(74) Attorney, Agent, or Firm—Daniel B. Ruble

(57) ABSTRACT

A heat sealing/severing device for heat sealing thermoplastic films together. The device includes front and rear opposing jaws that are moveable between an open position and a closed position. The open position defines a zone for inserting the thermoplastic films between the front and rear jaws. In the closed position, the front and rear jaws are proximate each other to compress the thermoplastic films together. The rear jaw includes a resilient portion facing the front jaw. The heating element of the device may have a cross-sectional thickness no less than 0.55 times the cross-sectional thickness of the resilient portion. A front jaw release sheet (e.g., an unreinforced fluoroplastic) may be positioned between the insertion zone and the heating element. The front jaw release sheet may engage the heating element when the front and rear jaws are in the closed position and disengage from the heating element when the front and rear jaws are in the open position. The present heat sealer can form consistent heat seals with fewer leaks and is especially useful in sealing and severing relatively thin thermoplastic films.

41 Claims, 5 Drawing Sheets

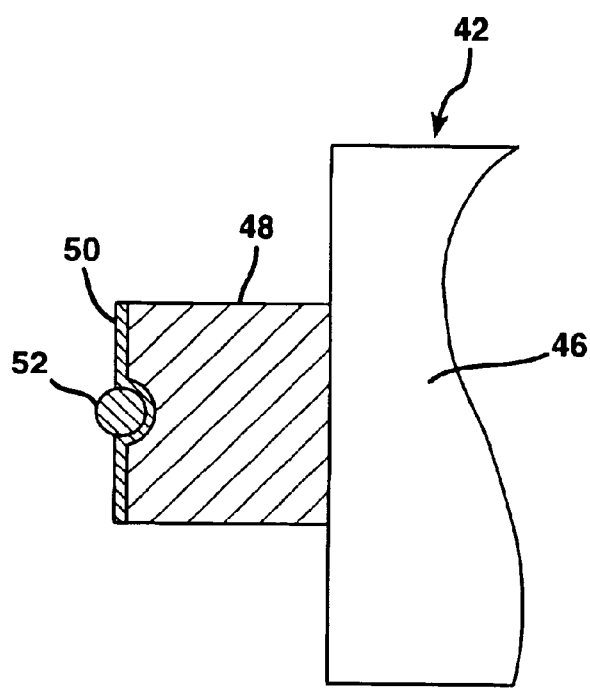

HEAT SEALER FOR THERMOPLASTIC FILMS

BACKGROUND OF THE INVENTION

The present invention relates to a heat sealing device, and more particularly to a heat sealing device useful for simultaneously sealing and severing thermoplastic films.

It is well known to those of skill in the art to use a hot-wire sealer or impulse sealing device to simultaneously seal and sever thermoplastic films. FIGS. 1–2 show a typical prior art impulse heat sealing device 8 in the open and closed positions, respectively. Heat sealer 8 includes opposing front jaw 10 and rear jaw 12. First and second films 30 and 32 are inserted between the opposing jaws. Front jaw 10 includes jaw base 16 on which is mounted an insulating layer 18 of polytetrafluoroethylene ("PTFE") coated woven fiberglass. Heat sealing element 20, which is typically a nichrome resistance wire, is adjacent the insulating layer 18. Front jaw release sheet 22, which is a PTFE-coated woven fiberglass, covers the heating element 20. Because the front jaw release sheet 22 includes a woven fiberglass substrate made up of relatively stiff glass yarns, the release sheet forms voids or air pockets 24 on either side of the heating element 20. However, if the front jaw release sheet 22 were to be conformed around heating element 20 to reduce or eliminate the voids 24, then the glass yarns of the woven fiberglass substrate may break, fracture, or tear during the heat seal operation, thus reducing the effectiveness and life of the front jaw release sheet 22.

Rear jaw 12 includes rear jaw base 26 on which is mounted resilient pad 14, typically made of silicone rubber. Rear jaw release sheet 28 is a PTFE-coated woven fiberglass that covers pad 14. The cross-sectional thickness of resilient pad 14—taken from the rear jaw base 26 to rear jaw release sheet 28—is greater than the cross-sectional diameter or thickness of heat sealing element 20. For example, the pad thickness is more than twice as great as the heat seal element cross-sectional diameter. This difference in thickness allows heating element 20 to press into the pad 14 during the sealing operation, as discussed below.

In operation to form heat seals 36, the first and second jaws move toward each other so that front jaw release sheet 22 engages first film 30 and rear jaw release sheet 28 engages second film 32. The voids 24 and the relative stiffness of front jaw release sheet 22 cause the films in the contact area 34 to conform to a minimal portion of the total surface area of heating element 20. Thus, films 30 and 32 are subjected to pressure only in the relatively narrow localized area 34 rather than broadly conforming to the heating element 20. Typically, the films 30, 32 conform to less than 20% of the total surface area of heating element 20. This small amount of conformity in contact area 34 causes the resulting heat seals 36 to have a relatively narrow width.

Once the front and rear jaws have closed on films 30 and 32 (FIG. 2), the resiliency and thickness of pad 14 causes the pad to apply a relatively constant or uniform pressure to the films 30 and 32 where they conform to the shape of heating element 20. This relatively uniform pressure across the contact area 34 often causes the films 30 and 32 to tear in the area 34 rather than cleanly severing under the heat and pressure of the heating element. The resulting seal/cut has been found to be inadequate for some applications, for example, where a sealed bag contains fluids rather than solids or is required to be impermeable.

SUMMARY OF THE INVENTION

The problems discussed above are overcome in the present inventive heat sealing/severing device for heat sealing at least two thermoplastic films together. The device includes front and rear opposing jaws that are moveable between an open position and a closed position. The open position defines a zone for inserting the films between the front and rear jaws. In the closed position, the front and rear jaws are proximate each other to compress the thermoplastic films together. The rear jaw includes a resilient portion facing the front jaw. A heating element is positioned between the insertion zone and the front jaw. In a first aspect, the heating element has a cross-sectional thickness no less than 0.55 times the cross-sectional thickness of the resilient portion.

In a second aspect, a front jaw release sheet is positioned between the insertion zone and the front jaw when the front and rear jaws are in the open position. The heating element is positioned between the front jaw release sheet and the front jaw. In one embodiment of this aspect, the front jaw release sheet engages the heating element when the front and rear jaws are in the closed position and disengages from the heating element when the front and rear jaws are in the open position. In a second embodiment of this aspect, the front jaw release sheet is unreinforced. In a third embodiment of this aspect, the heating element has a cross-sectional thickness no less than about 0.55 times the cross-sectional thickness of the resilient portion.

The present invention includes a method of simultaneously sealing and severing at least two thermoplastic films by the following steps. First, insert the thermoplastic films in the insertion zone of the device of the present invention. Next, move the front and rear jaws to the closed position. As a result, the thermoplastic films are pressed together between the front and rear jaws. Then, apply an electrical impulse to the heating element to increase the temperature of the heating element to a point sufficient to simultaneously sever and heat seal the thermoplastic films. Next, discontinue the electrical impulse to the heating element while the front and rear jaws are in the closed position to set the heat seal.

The heat sealer of the present invention provides several advantages. The front jaw release sheet—which prevents the heating element from sticking to the heat sealed films—has a longer effective life because it may engage the heating element only while the heat sealer is in the closed position. Further, the use of an unreinforced release material (e.g., skived PTFE) for the front jaw release sheet allows the release sheet to better conform to the heating element—thus reducing the size of the voids that are present on either side of the heating element. As a result, the films better conform to the heating element and thus form broader heat seats than a comparative prior art heat sealer. Further, the use of unreinforced release materials for the front and rear jaw release sheets eliminates the chance that reinforcement substrate fibers may tear or otherwise interfere with the sealing and severing process.

The present heat sealer can form consistent heat seals with fewer leaks. The heat sealer/sever device may be used to heat seal two or more films, for example, films as thick as up to 0.010 and 0.015 inches. The heat sealer is especially useful in sealing and severing relatively thin thermoplastic films, such as those having a thickness of less than 0.004 inches (e.g., from about 0.0006 to about 0.002 inches). The resulting heat seals are relatively impermeable, and are suitable for containing fluids. This is in part because the thickness of the heating element may be at least as great as that of the resilient portion of the rear jaw. Once the heat sealer is closed, the resilient portion of the rear jaw applies a compressive force to the films that inherently decreases as the distance from the apex of the heating element increases.

As a result, the softened or melted film material is extruded away from the apex area into the heat seal region to reduce voids or leaks and enhance seal consistency. Yet, the heat element cleanly severs the film at the heating element's apex.

These and other objects, advantages, and features of the invention will be more readily understood and appreciated by reference to the detailed description of the invention and the drawings.

BRIEF DESCRIPTION OF THE DRAWINGS

FIG. 6 is a cross-sectional view of an alternative configuration for the front jaw and heat sealing element of FIG. 3.

DETAILED DESCRIPTION OF THE INVENTION

Figure 1:
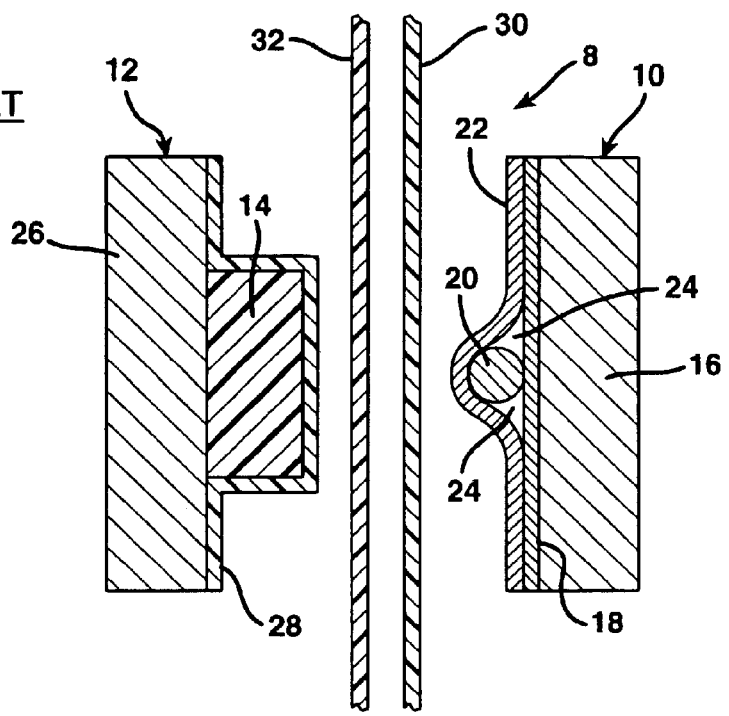
FIG. 1 is a cross-sectional view of a prior art heat sealer in the open position.
Figure 2:
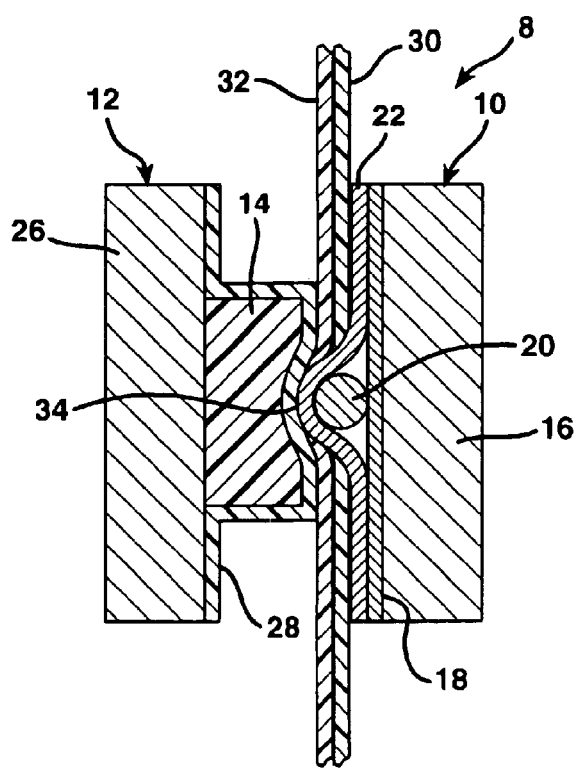
FIG. 2 is a cross-sectional view of the heat sealer of FIG. 1 in the closed position.

The heat sealing device 40 of the present invention includes front jaw 42 and rear jaw 44. The front and rear jaws are moveable between and open position (FIG. 3)—in which at least two thermoplastic films that are to be heat sealed and severed may be inserted between the front and rear jaws—and a closed position (FIG. 4), where the front and rear jaws are proximate each other to compress, sever, and heat seal the thermoplastic films. At least one of the front and rear jaws 42, 44 may be connected to a motor (not shown) for moving the jaws between the open and closed positions.

Front jaw 42 includes a front jaw base portion 46 to provide structural support to the front jaw. The base portion 46 may be constructed of a material and configuration that are suitable for providing the necessary mechanical support and strength to the jaw of the heat-seal/sever device 40. Aluminum is a preferred material because it is lightweight, strong, and relatively inexpensive. The front jaw 42 may generally have a rectangular-sided polyhedron shape.

Front jaw 42 may include a front jaw insulator portion 48 mounted or adjacent to the front jaw base portion 46. Insulator portion 48 includes a sufficient amount and type of material to provide the hardness, temperature resistance, and electrical and heat insulation characteristics necessary to support and isolate the heating element 52 from front jaw base portion 46 during the seal/sever operation (discussed below). Useful materials for insulator portion 48 include phenolic resin and phenolic resin composites (e.g., reinforced phenolic moldings).

Front jaw 42 may also include insulating layer 50 covering at least a portion of the front of insulator portion 48. The insulating layer 50 further electrically and thermally isolates heating element 52 from front jaw base portion 46. Insulating layer 50 includes a material suitable as a high temperature insulator, for example a polyimide or fluoroplastic material, such as a fluoroplastic (e.g., PTFE) coated woven fiberglass. Insulating layer 50 may be adhesively mounted to insulator portion 48, in which case the insulating layer 50 may include a PTFE-coated woven fiberglass tape.

Rear jaw 44 includes rear jaw base portion 54 to provide structural support for rear jaw 44 and may also include rear jaw insulator portion 56 to provide hardness, temperature resistance, and electrical and thermal insulation characteristics. Rear jaw base portion 54 and insulator portion 56 may be constructed of the same materials and have similar configurations as front jaw base portion 46 and insulator portion 48 discussed above.

Rear jaw 44 includes a resilient portion 58 located in a section of rear jaw 44 that is proximate front jaw 42 (i.e., the resilient portion 58 "faces" front jaw 42). In the embodiment shown in the drawings, resilient portion 58 is a resilient pad mounted or adhesively applied on the face of rear jaw insulator portion 56. However, the resilient portion 58 may be an integral part either of the insulator portion 56 or of another section of rear jaw 44. The resilient portion 58 may include an elastomeric material, such as silicone rubber or a fluoroelastomer, that has suitable heat resistance characteristics for the desired heat-seal/sever application.

Figure 3:
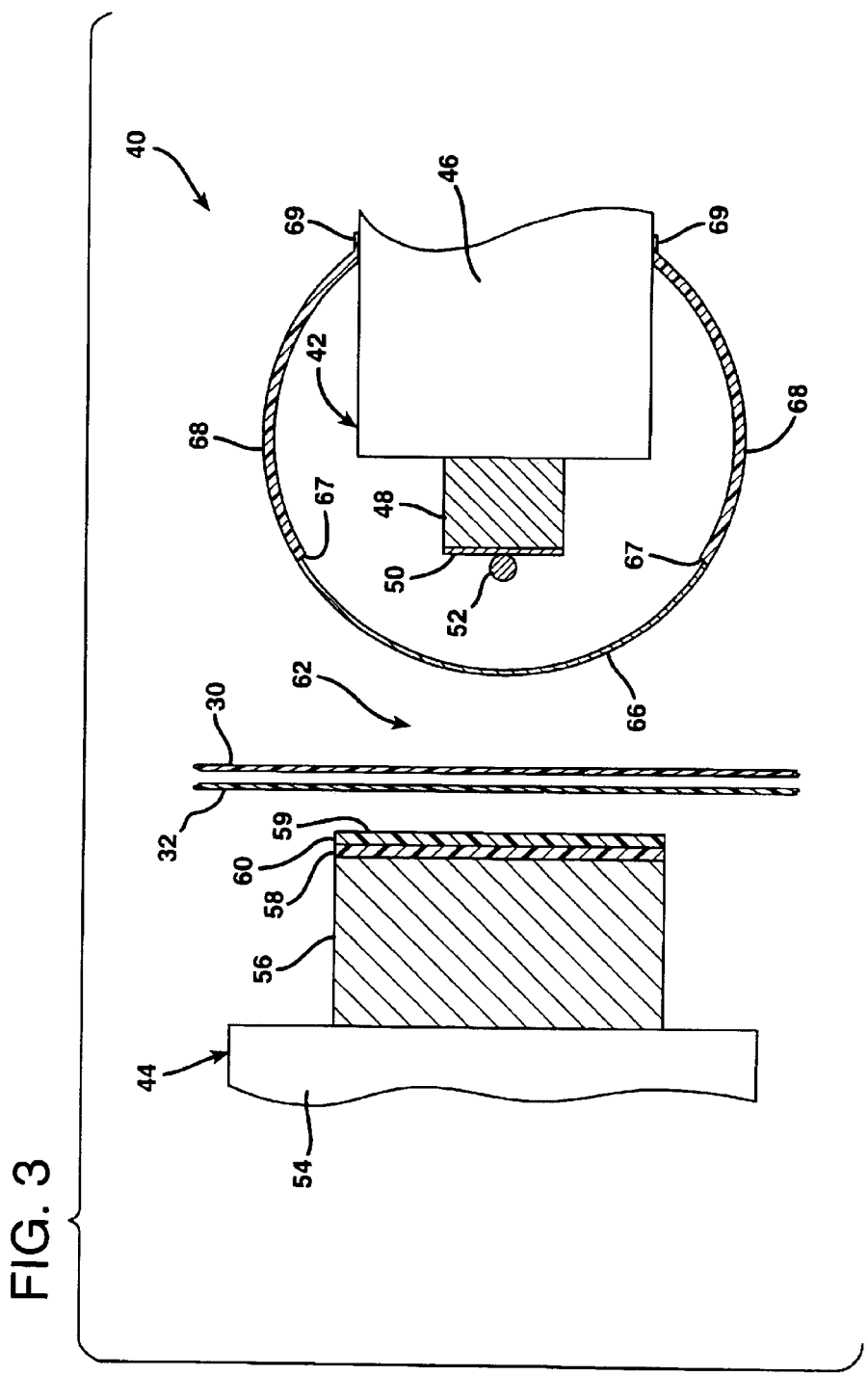
FIG. 3 is a cross-sectional view of a heat sealer of the present invention in the open position with two films to be heat sealed inserted.

The selection of the cross-sectional thickness and hardness of the resilient portion 58 that produces an optimal heat seal/sever for a given application may be determined using routine experimentation by one of skill in the art. This selection depends on several factors, such as the cross-sectional thickness of the heating element 52 (discussed below) and the physical characteristics (e.g., hardness) of the film being heat sealed. The resilient portion 58 has a cross-sectional thickness (as shown in FIG. 3) preferably no greater than about (in ascending order of preference) 1.8, 1.5, 1.0, 0.67, 0.5, and 0.25 times the cross-sectional diameter or thickness of heating element 52. The hardness (i.e., indentation hardness) of the resilient portion 58 is preferably at least as hard as the hardness of films 30, 32 (taken at room temperature).

Preferably, the surface 59 of rear jaw 44 that faces front jaw 42 includes a release or non-stick characteristic sufficient to preclude the adherence of film 32 to the rear jaw 44 during the heat seal operation (discussed below). This release characteristic may be inherent in the material selected for resilient portion 58 or may be provided by rear jaw release sheet 60 applied to resilient portion 58. Rear jaw release sheet 60 may include a material capable of repeated exposure to the temperature of the sealing/severing process while maintaining the desired release characteristics to prevent the heat sealed/severed films from adhering to rear jaw 44. Suitable release materials include reinforced polyimides or fluoroplastics, such as PTFE-coated woven fiberglass, and non-reinforced polyimides or fluoroplastics, such as skived PTFE. A non-reinforced material is preferred because it avoids the problem of having the reinforcement substrate fibers tear or break, which may hinder a clean heat seat/sever operation. Further, a non-reinforced release material is less stiff than a reinforced material, and therefore has less tendency to negatively affect the resiliency of resilient portion 58. The rear jaw release sheet 60 may be adhesively applied to the resilient portion 58. The thickness of rear jaw release sheet 60 is sufficient to provide the desired release characteristics without reducing the resiliency of resilient portion 58 to an undesirable level. For example, the thickness of the rear jaw release sheet may be equal to about ⅓ or less of the thickness of the resilient portion 58. Suitable thicknesses may also include from 0.001 to 0.015 inches, for example from 0.003 to 0.010 inches.

In the open position (FIG. 3), front and rear jaws 42, 44 define a zone 62 for inserting first and second films 30 and 32 between the jaws. The embodiment shown in the drawings illustrates two films being heat sealed together; however, device 40 may be used to heat seal and/or sever at least two films. The phrase "at least two films" as used in this application includes the meanings of: i) one sheet folded over upon itself to, in effect, form two films for heat sealing, ii) a tube of film material laid flat so that two tube sides are adjacent each other for heat sealing, and iii) two or more films. The films 30 and 32 may include any thermoplastic material suitable for a heat-seal/sever application.

Front jaw release sheet 66 may be positioned between insertion zone 62 and front jaw 42 when the heat sealer 40 is in the open position. The front jaw release sheet 66 includes a type and amount of material sufficient to quickly transfer sufficient heat from heating element 52 to the films 30 and 32 to effect the heat seal/sever operation—yet help prevent films 30 and 32 from sticking to heating element 52 after repeated exposure to the sealing/severing temperature of the heat seal operation (discussed below). Suitable materials (i.e., "release materials") for the front jaw release sheet 66 include reinforced polyimides and fluoroplastics, such as PTFE-coated woven fiberglass, and non-reinforced polyimides and fluoroplastics, such as skived PTFE.

Preferably, the front jaw release sheet 66 has a configuration, construction, and thickness that allows it to more easily conform to heating element 52 during the heat seal operation. To that end, the front jaw release sheet 66 may include a non-reinforced material to better conform to the heating element 52 during the heat seal operation and also to avoid torn or broken reinforcement substrate fibers. "Non-reinforced" or "unreinforced," as used in this application to describe a release material or sheet, means that the release material is substantially free or devoid of a substrate material (such as woven or matted fiberglass) to provide strength attributes to the material. A suitable thickness for the front jaw release sheet 60 may be determined by routine experimentation by one of skill in the art, and depends on factors including the physical characteristics of the release sheet, the desired heat transfer rate through the release sheet, and the physical characteristics of the films being sealed. A useful thickness for the front jaw release sheet that comprises skived PTFE ranges from about 0.0020 to about 0.0025 inches for the application of heat-sealing/severing two polyethylene films each having a thickness of from about 0.0005 to about 0.0015 inches.

As an alternative to front jaw release sheet 66, the desired release characteristic or preventing the heat sealed/severed films from sticking to heating element 52 may be achieved by incorporating a non-stick attribute to the external surface of heating element 52—or by making the resistance wire from a material that inherently possesses the desired release or non-stick characteristic. Less preferably, heat seal/sever device 40 may be constructed without a front jaw release sheet 66 or a surface-incorporated release characteristic for the heating element 52—in which case, the heating element will typically require more frequent cleaning during the heat seal/sever operation.

One or more spacers 68 may serve to space or disengage front jaw release sheet 66 away or apart from heating element 52 when the sealing device 40 is in the open position (FIG. 3). In the preferred embodiment illustrated in the drawings, a first end 67 of each of spacers 68 is attached to the front jaw release sheet 66 and a second end 69 of each of spacers 68 is attached to front jaw base portion 46 of the front jaw. However, the second end 69 may alternatively be attached to another section of front jaw 42 (such as the front jaw insulator portion 48) or may be attached to another base (not shown) that is external to the heat sealer device 40. The spacers 68 may be constructed of a rigid or flexible material (such as metal or plastic) in a configuration that is suitable to position the front jaw release sheet between the insertion zone 62 and the heating element 52 when the device 40 is in the open position.

Preferably, spacers 68 include an amount and type of material having sufficient flexibility and resiliency (i.e., "recoiling material") so that spacers 68 have the characteristics and capability of repeatedly springing, recoiling, or disengaging front jaw release sheet 66 away from (i.e., spacing the front jaw release sheet apart from) heating element 52 as sealing device 40 opens. Where spacers 68 include sufficient amount and type of recoiling material to impart this characteristic, spacers 68 may be deemed "recoilers." Suitable recoiling materials include biaxially oriented polyester film (such as the polyethylene terephthalate film sold by Dupont under the MYLAR trademark), polyvinylchloride (PVC) plastic film, and the like. Other recoiling materials may include plastic or metal springs, sheet metal, woven metal wire, plastic sheets, and foam rubber.

Heating element 52 is positioned between front jaw release sheet 66 and front jaw 42. Heating element 52 may be embedded in front jaw 42 (FIG. 6), adjacent the surface of front jaw 42 (e.g., adjacent insulating layer 50 of FIGS. 3–5), or spaced apart from front jaw 42 when device 42 is in the open position (not shown). The embodiment having an embedded heating element (FIG. 6) provides the advantages of retaining the heating element 52 in a more fixed position relative to the front jaw 42 and lowering the cross-sectional profile of heating element 52.

Useful materials and configurations for heating elements for impulse heat sealers are known in the art. For example, heating element 52 may include a circular-cross sectional metal wire, such as a nichrome resistance wire, that heats rapidly upon the application of an electrical current. The heating element wire may be pre-stretched to reduce expansion of the wire during the heat seal operation over the life of the wire.

The optimal cross-sectional thickness or diameter for heating element 52 for a given application may be determined by routine experimentation by those of skill in the art, and depends upon factors such as: i) the physical characteristics (e.g., hardness and thickness) of the films being heat sealed/severed and ii) the thickness and resiliency (e.g., hardness) of the resilient pad 58. The heating element 52 has a cross-sectional diameter or thickness that may be no less than about (in ascending order of preference) 0.55, 0.65, 0.75, 1.0, 1.5, 2.0, and 2.5 times the cross-sectional thickness of rear jaw resilient portion 58. Further, the cross-sectional thickness of heating element 52 may be no more than twice the total cross-sectional thickness of the films being heat sealed/severed. Useful ranges for the cross-sectional thickness or diameter of heating element 52 include (in ascending order of preference) from about 0.002 to 0.060 inches, from about 0.010 to about 0.030 inches, and from about 0.015 to about 0.025 inches. For the application of heat-sealing/severing two polyethylene films each having a thickness of from about 0.0005 to about 0.0015 inches, a useful cross-sectional thickness for the heating element ranges from about 0.015 to about 0.025 inches, preferably about 0.020 inches.

Heating element 52 is connected to an electrical impulse providing apparatus (not shown). Preferably, the electrical connections (not shown) to the heating element 52 are as close as practical to the working area of the heating element in order to reduce the chance of hot spots and lower the power requirements of the heating element for a given temperature.

Operation and Use of the Sealing/Severing Device

Figure 4:
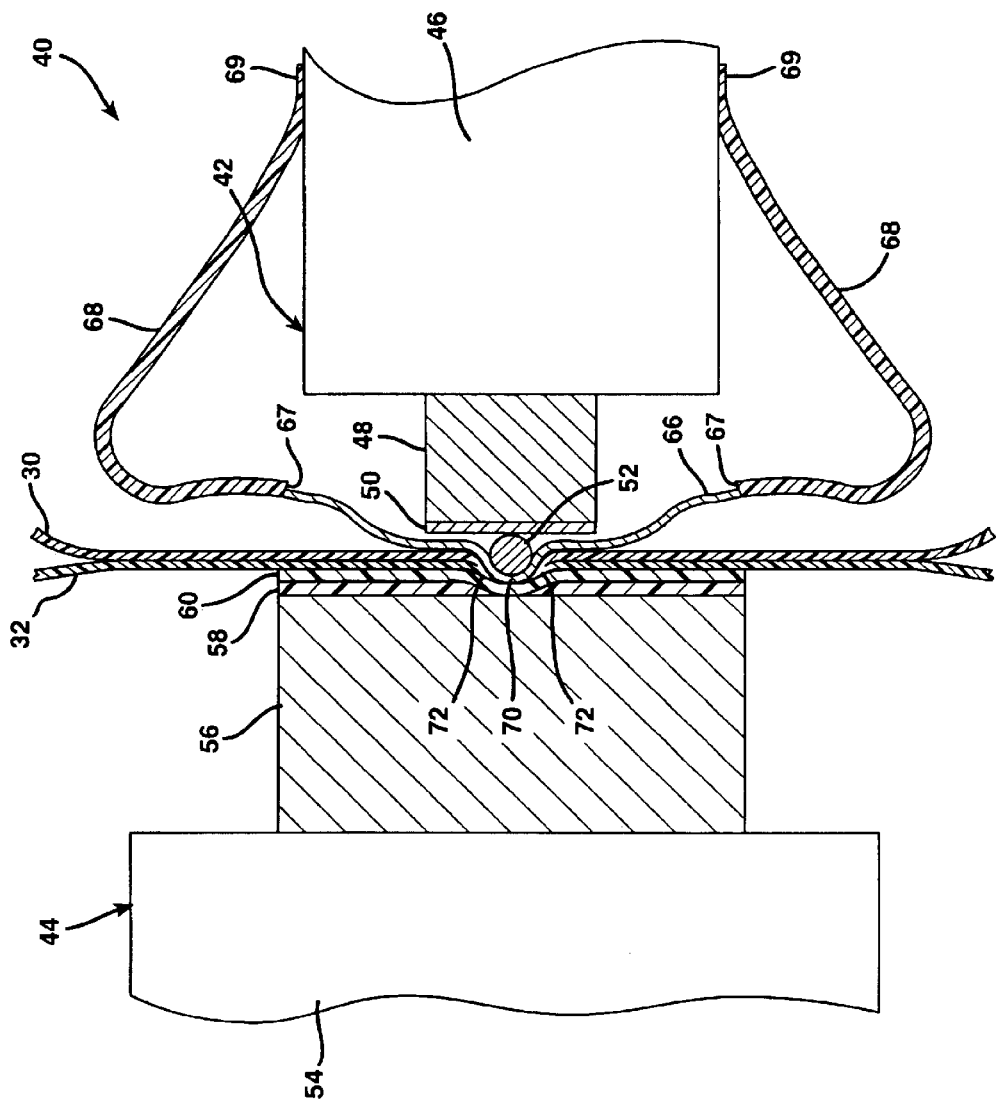
FIG. 4 is a cross-sectional view of the heat sealer of FIG. 3 in the closed position.

To simultaneously seal and sever first and second films 30 and 32, heat sealer 40 begins in the open position. (FIG. 3.) Films 30 and 32 are fed into insertion zone 62. The front and rear jaws 42, 44 are closed onto the films 30 and 32. (FIG. 4.) In doing so, front jaw release sheet 66 engages both heating element 52 and first film 30. The front jaw release sheet helps "iron" or smooth out any wrinkles that may be present in films 30 and 32 in the area to be heat sealed.

Once the device 40 is closed, the films 30, 32 are trapped between the front and rear jaws by the pressure exerted by heating element 52 on rear jaw resilient portion 58. An electrical impulse is then fed through heating element 52 to heat it to the desired heat-seal/sever temperature appropriate for the materials and thickness of films 30 and 32. The heated heating element 52 transfers heat through front jaw release sheet 66 to films 30, 32 to soften or melt the films in the heat seal region.

Because the front jaw release sheet 66 preferably lacks a substrate reinforcement to stiffen the release sheet, the front jaw release sheet (and thus films 30, 32) may more easily conform to heating element 52 when the heat sealer 40 is in the closed position, for example, conforming to greater than 20% of the surface area of the heating element 52 that is within the transverse width of the heat sealed films, preferably greater than 30%, and more preferably greater than 40%. This amount of conformity results in a relatively larger width heat seal 72 (as measured from the sever) than the heat seals formed by comparative prior art heat seal devices that use reinforced release sheets.

Due to the preferred relative sizes of the rear jaw resilient portion 58 and heating element 52 (as discussed above), the rear jaw resilient portion 58 compresses against the relatively non-compressive rear jaw insulator portion 56. At this point, the compressive force is greatest at the apex 70 of the heating element 52. This compressive force—in combination with the softening of the films by the heat transferred from the heating element 52—severs the films at apex 70. In fact, the rear jaw resilient portion 58 may compress to the point where it "bottoms out" against the relatively non-compressive rear jaw insulator portion 56—that is, the heating element 52 may compress the rear jaw resilient portion 58 to the point where the resilient portion 58 has similar compression characteristics as the films 30 and 32.

The concentrated compressive force at apex 70 extrudes the softened or melted film material to both sides of the heating element 52. Further, the soft and resilient portion 58 forces films 30, 32 to conform to the sides of heating element 52 with gradually decreasing compressive force as the distance from the apex 70 increases. As a result, films 30, 32 are compressed together during the heat seal operation with gradually decreasing force as the distance from the sever (i.e., apex 70) increases. Thus, the amount of soften or melted film material that flows or is extruded from the area of apex 70—material that assists in forming heat seals 72—decreases as the distance increases from apex 70. The resulting heat seals 72 gradually decrease in fusion between films 30 and 32 as the distance from the sever increases—resulting in a more consistent heat seal with fewer leaks.

Figure 5:
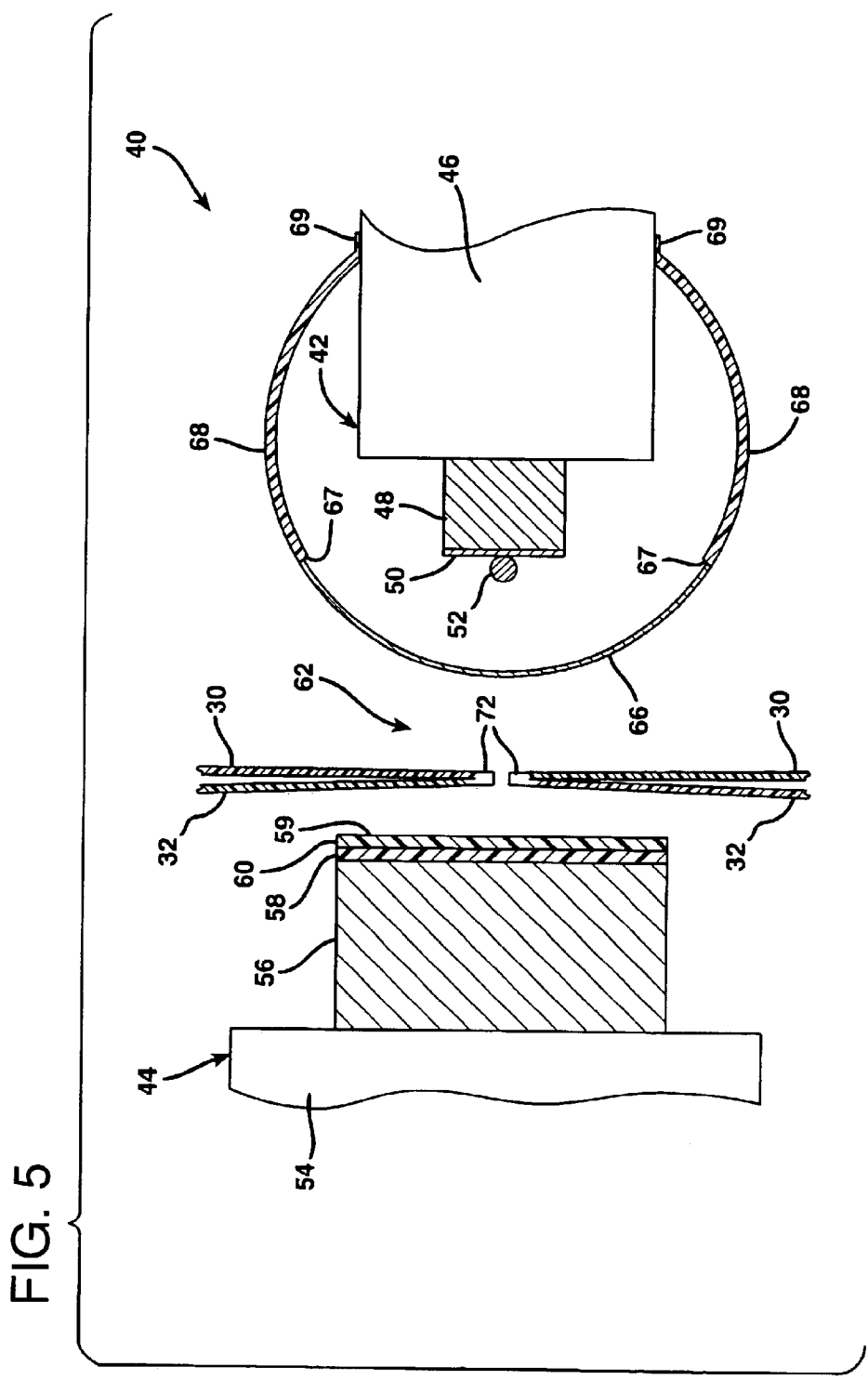
FIG. 5 is a cross-sectional view of the heat sealer of FIG. 3 in the open position with the two films heat sealed and severed.

On After the films are severed, the electrical impulse device is switched off to allow the films to cool (while under pressure) so that the heat seals 72 are set (i.e., cooled to the point that the heat seal does not separate upon opening the jaws). The front and rear jaws 42, 44 are then opened to release the heat-sealed and severed films. (FIG. 5.) The release or non-stick characteristics of front and rear jaw release sheets 60 and 66 help to assure that the films 30, 32 do not stick to the front and rear jaws 42, 44 and, that heating element 52 remains relatively clean. As the jaws open, the spacers 68 preferably cause the front jaw release sheet 66 to spring away from heating element 52. This minimizes the amount of time in which the front jaw release sheet 66 is exposed to the high temperature of the heating element—resulting in reduced thermal degradation and increased useful life for the front jaw release sheet 66.

The heat-sealing/severing device 40 may be operated in a high speed, repetitive manner. Times required for the sealing/severing mode and cooling mode depend on numerous factors, including the thickness and physical properties of the films being sealed and severed. Sealing/severing times may range from about 0.2 to 3 seconds, preferably from about 0.45 to about 0.7 seconds. Cooling times may range from about 0.05 to about 8 or more seconds, preferably from about 0.05 to about 0.1 seconds.

The heat-sealing/severing device 40 may be used as part of a vertical form and fill machine, for example to simultaneously form transverse heat seals (i.e., end seals) across a tubular thermoplastic material while severing the newly formed bag from the remaining tubular material. This type of application is described in U.S. Pat. No. 4,981,546 issued Jan. 1, 1991 to Bergevin and U.S. Pat. No. 5,538,590 issued Jul. 23, 1996 to Riley. The heat-sealing/severing device is also useful as part of: i) the apparatus for producing foam filled packaging cushions described in U.S. Pat. No. 5,335,483 issued Aug. 9, 1994 to Gavronsky and ii) the machine for producing inflated packaging cushions described in U.S. Pat. No. 5,942,076 issued Aug. 24, 1999 to Salerno. Each of these four patents is incorporated herein in its entirety by reference.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Except in the claims and the specific examples, or where otherwise expressly indicated, all numerical quantities in this description indicating amounts of material, use conditions, characteristics of materials, and the like are to be understood as modified by the word "about" in describing the broadest scope of the invention. Any reference to an item in the disclosure or to an element in the claims in the singular using the articles "a," "an," "the," or "said" is not to be construed as limiting the item or element to the singular unless expressly so stated.

What is claimed is:

1. A device for heat sealing at least two thermoplastic films together, the device comprising:

front and rear opposing jaws moveable between an open position defining a zone for inserting the at least two films between the front and rear jaws and a closed position in which the front and rear jaws are proximate each other to compress the at least two thermoplastic films together, the rear jaw including a resilient portion facing the front jaw, the resilient portion having a given cross-sectional thickness;

a rear jaw release sheet adjacent to the resilient portion of the rear jaw, the rear jaw release sheet including an unreinforced release material;

a front jaw release sheet positioned between the insertion zone and the front jaw when the front and rear jaws are in the open position, the front jaw release sheet including an unreinforced release material;

a heating element positioned between the front jaw release sheet and the front jaw, the heating element having a cross-sectional thickness no less than about 0.55 times the cross-sectional thickness of the resilient portion; and at least one recoiler having a first end attached to the front jaw release sheet and a second end attached to the front jaw, wherein the recoiler disengages the front jaw release sheet from the heating element when the front and rear jaws are in the open position.

2. The device of claim 1 wherein the cross-sectional thickness of the heating element is no less than the cross-sectional thickness of the resilient portion.

3. The device of claim 1 wherein the cross-sectional thickness of the heating element is no less than about 2.0 times the cross-sectional thickness of the resilient portion.

4. The device of claim 1 wherein the heating element is at least partially embedded in the front jaw when the front and rear jaws are in the open position.

5. The device of claim 1 for heat sealing at least two thermoplastic films having a given transverse width, wherein when the front and rear jaws are in the closed position, the front jaw release sheet conforms to greater than 20% of the surface area of the heating element that is within the transverse width of the at least two thermoplastic films.

6. The device of claim 1 wherein the unreinforced release material is a fluoroplastic material.

7. A method of simultaneously sealing and severing at least two thermoplastic films, the method comprising:

inserting the at least two thermoplastic films in the insertion zone of the device of claim 1;

moving the front and rear jaws to the closed position whereby the at least two thermoplastic films are pressed together between the front and rear jaws;

applying an electrical impulse to the heating element to increase the temperature of the heating element to a point sufficient to simultaneously sever and heat seal the at least two thermoplastic films; and discontinuing the electrical impulse to the heating element while the front and rear jaws are in the closed position to set the heat seal.

8. The method of claim 7 wherein the total thickness of the at least two thermoplastic films is no more than about 0.004 inches.

9. A device for heat sealing at least two thermoplastic films together, the device comprising:

front and rear opposing jaws moveable between an open position defining a zone for inserting the at least two films between the front and rear jaws and a closed position in which the front and rear jaws are proximate each other to compress the at least two thermoplastic films together, the rear jaw including a resilient portion facing the front jaw;

a front jaw release sheet positioned between the insertion zone and the front jaw when the front and rear jaws are in the open position;

a heating element positioned between the front jaw release sheet and the front jaw, wherein the front jaw release sheet engages the heating element when the front and rear jaws are in the closed position and disengages from the heating element when the front and rear jaws are in the open position; and at least one spacer attached to the front jaw release sheet, wherein the front jaw release sheet is disengaged from the heating element when the front and rear jaws are in the open position.

10. The device of claim 9 wherein at least one spacer includes a recoiler.

11. The device of claim 10 wherein the recoiler includes:
a first end attached to the front jaw release sheet; and
a second end attached to the front jaw.

12. A device for heat sealing at least two thermoplastic films together, the device comprising:

front and rear opposing jaws moveable between an open position defining a zone for inserting the at least two films between the front and rear jaws and a closed position in which the front and rear jaws are proximate each other to compress the at least two thermoplastic films together, the rear jaw including a resilient portion facing the front jaw;

a front jaw release sheet positioned between the insertion zone and the front jaw when the front and rear jaws are in the open position; and a heating element positioned between the front jaw release sheet and the front jaw, wherein the front jaw release sheet engages the heating element when the front and rear jaws are in the closed position and disengages from the heating element when the front and rear jaws are in the open position and wherein the resilient portion of the rear jaw faces the heating element so that the resilient portion conforms to the shape of the heating element when the front and rear jaws are in the closed position, wherein the heating element is at least partially embedded in the front jaw when the front and rear jaws are in the open position.

13. The device of claim 12 wherein the front jaw release sheet includes an unreinforced release material.

14. The device of claim 13 wherein the unreinforced release material includes a fluoroplastic material.

15. The device of claim 12 wherein the surface of the resilient portion of the rear jaw facing the front jaw includes a release characteristic.

16. The device of claim 12 further comprising a rear jaw release sheet adjacent to the resilient portion of the rear jaw.

17. The device of claim 16 wherein the rear jaw release sheet includes an unreinforced fluoroplastic material.

18. The device of claim 12 wherein:

the heating element and the resilient portion of the rear jaw each have a given cross-sectional thickness; and the cross-sectional thickness of the heating element portion that is unembedded in the front jaw is no less than about 0.55 times the cross-sectional thickness of the resilient portion.

19. The device of claim 18 wherein the cross-sectional thickness of the heating element portion that is unembedded in the front jaw is no less than the cross-sectional thickness of the resilient portion.

20. The device of claim 18 wherein the cross-sectional thickness of the heating element portion that is unembedded in the front jaw is no less than about twice the cross-sectional thickness of the resilient portion.

21. The device of claim 12 for heat sealing at least two thermoplastic films having a given transverse width, wherein when the front and rear jaws are in the closed position, the front jaw release sheet conforms to greater than 20% of the surface area of the heating element that is within the transverse width of the at least two thermoplastic films.

22. A device for simultaneously heat sealing and severing at least two thermoplastic films, the device comprising:

front and rear opposing jaws moveable between an open position defining a zone for inserting the at least two films between the front and rear jaws and a closed position in which the front and rear jaws are proximate each other, the rear jaw including a resilient portion facing the front jaw, the resilient portion having a given cross-sectional thickness;

a front jaw release sheet positioned between the insertion zone and the front jaw when the front and rear jaws are in the open position; and a heating element positioned between the front jaw release sheet and the front jaw, wherein the cross-sectional portion of the heating element that is unembedded in the front jaw is no less than about 0.55 times the cross-sectional thickness of the resilient portion.

23. The device of claim 22 wherein the cross-sectional thickness of the heating element is no less than the cross-sectional thickness of the resilient portion.

24. The device of claim 22 wherein the cross-sectional thickness of the heating element is no less than about 1.5 times the cross-sectional thickness of the resilient portion.

25. The device of claim 22 wherein the cross-sectional thickness of the heating element is no less than about twice the cross-sectional thickness of the resilient portion.

26. The device of claim 22 wherein the front jaw release sheet includes an unreinforced release material.

27. The device of claim 22 wherein the surface of the resilient portion of the rear jaw facing the front jaw includes a release characteristic.

28. The device of claim 22 further comprising a rear jaw release sheet adjacent to the resilient portion of the rear jaw.

29. The device of claim 28 wherein the rear jaw release sheet includes an unreinforced release material.

30. A device for heat sealing at least two thermoplastic films together, the device comprising:

front and rear opposing jaws moveable between an open position defining a zone for inserting the at least two films between the front and rear jaws and a closed position in which the front and rear jaws are proximate each other, the rear jaw including a resilient portion facing the front jaw, the resilient portion having a given cross-sectional thickness;

a front jaw release sheet positioned between the insertion zone and the front jaw when the front and rear jaws are in the open position;

a heating element positioned between the front jaw release sheet and the front jaw, the heating element having a cross-sectional thickness no less than about 0.55 times the cross-sectional thickness of the resilient portion; and at least one spacer attached to the front jaw release sheet, wherein the front jaw release sheet is disengaged from the heating element when the front and rear jaws are in the open position.

31. The device of claim 30 wherein at least one spacer includes a recoiler.

32. The device of claim 31 wherein the recoiler includes:

a first end attached to the front jaw release sheet; and a second end attached to the front jaw.

33. A device for heat sealing at least two thermoplastic films together, the device comprising:

front and rear opposing jaws moveable between an open position defining a zone for inserting the at least two films between the front and rear jaws and a closed position in which the front and rear jaws are proximate each other to compress the at least two thermoplastic films together, the rear jaw including a resilient portion facing the front jaw;

a front jaw release sheet positioned between the insertion zone and the front jaw when the front and rear jaws are in the open position, the front jaw release sheet including an unreinforced release material;

a heating element positioned between the front jaw release sheet and the front jaw; and at least one spacer attached to the front jaw release sheet, wherein the front jaw release sheet is disengaged from the heating element when the front and rear jaws are in the open position.

34. The device of claim 33 wherein at least one spacer includes a recoiler.

35. The device of claim 34 wherein the recoiler includes:

a first end attached to the front jaw release sheet; and a second end attached to the front jaw.

36. A device for simultaneously heat sealing and severing at least two thermoplastic films, the device comprising:

front and rear opposing jaws moveable between an open position defining a zone for inserting the at least two films between the front and rear jaws and a closed position in which the front and rear jaws are proximate each other to compress the at least two thermoplastic films together, the rear jaw having a resilient portion facing the front jaw, the resilient portion having a given cross-sectional thickness; and a heating element positioned between the insertion zone and the front jaw, wherein the cross-sectional portion of the heating element that is unembedded in the front jaw is no less than about 0.55 times the cross-sectional thickness of the resilient portion.

37. The device of claim 36 wherein the cross-sectional thickness of the heating element is no less than the cross-sectional thickness of the resilient portion.

38. The device of claim 36 wherein the cross-sectional thickness of the heating element is no less than about twice the cross-sectional thickness of the resilient portion.

39. The device of claim 36 wherein the heating element is at least partially embedded in the front jaw when the front and rear jaws are in the open position.

40. The device of claim 36 wherein the surface of the resilient portion of the rear jaw facing the front jaw includes a release characteristic.

41. The device of claim 36 further comprising a rear jaw release sheet adjacent to the resilient portion of the rear jaw.

* * * * *